INVENTORS
GEORGE GERARD
RALPH P. PAPIRNO
BY Kenway Jenney
and Hildreth
ATTORNEYS

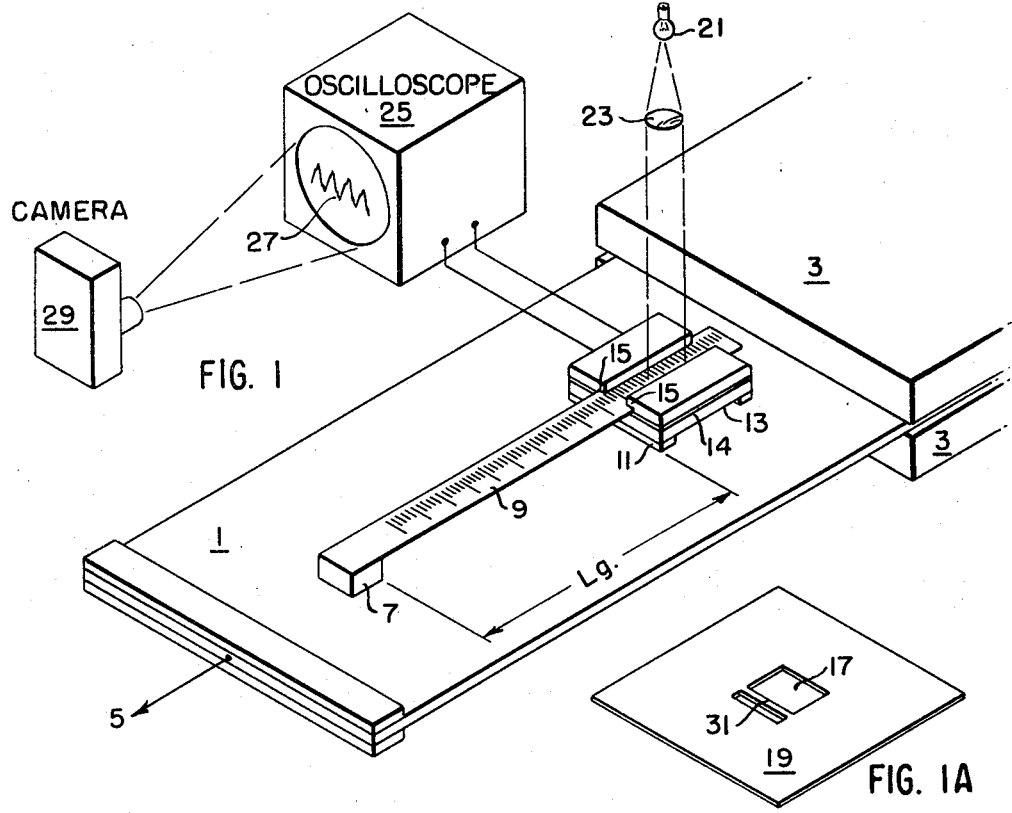
FIG. 1
FIG. 1A
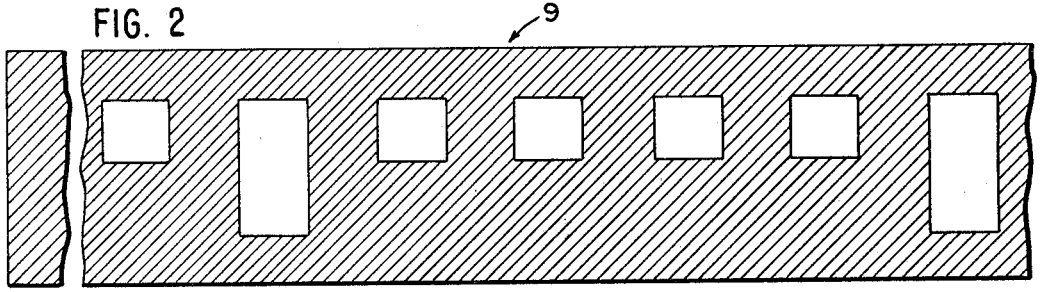
FIG. 2
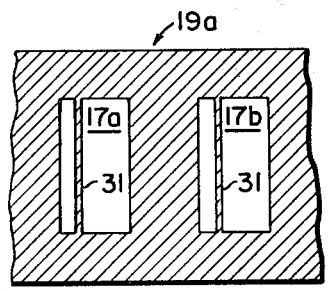
FIG. 3
INVENTORS
GEORGE GERARD
RALPH P. PAPIRNO
ATTORNEYS June 4, 1968  G. GERARD ETAL  3,387,139
PHOTOELECTRIC MEASURING APPARATUS USING GRATINGS
Filed Nov. 9, 1965  2 Sheets-Sheet 2

United States Patent Office 3,387,139
Patented June 4, 1968

3,387,139
PHOTOELECTRIC MEASURING APPARATUS
USING GRATINGS
George Gerard, Newton Center, and Ralph P. Papirno, Needham Heights, Mass., assignors to Allied Research Associates, Inc., Concord, Mass., a corporation of Delaware
Filed Nov. 9, 1965, Ser. No. 507,018
10 Claims. (Cl. 250—237)

This invention concerns itself with the measurement of displacements between two bodies, e.g., a piston and a cylinder, or between two parts of a single body, for example, the displacement of one part of a sample of yielding material from another part in response to an applied stress. Such a displacement, when reduced to a unit length of the material, is termed a strain, and apparatus for measuring such strains is commonly termed a strain gage. An object of the invention is to provide a visual indication of the sense, as well as the magnitude, of such a displacement. Another object is to provide the indication without benefit of special electronic apparatus other than the most elementary and common sort.

A known approach to the measurement of such displacements, and one that has proved suitable for the measurement of strains, employs a grid, a light gate, a light source, a light sensor, usually a photoelectric converter, e.g., a photocell, and a recorder. The grid is an elongated strip bearing a plurality of evenly spaced, parallel-sided transparent portions, each extending transversely of the long dimension of the grid, and alternating with opaque portions. The light gate is a parallel-sided window in an opaque frame or background. The grid is fixed to one point of a sample to be stressed and the gate is fixed to another point of the sample. Light from the source passes through the grid and the window in tandem and actuates the photocell. The current delivered by the photocell actuates the recorder. When the window lies squarely in the path of light through one of the transparent portions of the grid, it falls with full strength on the photocell and the output current is a maximum. When an opaque portion of the grid lies in the path of the light to the window or when the opaque window frame lies in the path of the light through a transparent portion of the grid, the light beam is obscured and the current falls sensibly to zero. As the sample is strained the points to which the grid and the gate, respectively, are fixed undergo a relative displacement, approaching toward, or receding from, each other, and the transparent portions of the grid pass by the window in succession. Each such passage is reflected in a single cycle of the output current; and hence of the record. The record thus furnishes a visual indication of the magnitude of the displacement between the supporting points and hence of the strain undergone by the sample.

The width of the parallel-sided window is coordinated with the widths of the transparent portions of the grid so as to maximize the light transmission in the one case and the obscuration in the other; i.e., the apertures are geometrically similar. When the light path length between grid and window is negligible, the widths are alike and the apertures are congruent. When magnification is employed, and an enlarged image of one member is projected on the other, the width of the further one is correspondingly greater than the width of the nearer one so that the image of the one member registers with the other member. Furthermore, if the strength of the available light source or the sensitivity of the available photocell presents a problem, a number of similar gate windows may be placed side by side; in effect, the single window described above may be replaced by a second grid, to all intents and purposes a replica, aside from enlargement, of the first grid.

A notable shortcoming of this approach to the measurement of the displacements is that, by itself, it gives no indication of the sense of the movement. While in some cases the sense is obvious, in other cases, notably in an investigation of the response to a shock or an impact, or in studies of vibratory movement, it is quite the reverse and can only be known from a direct indication; and the apparatus described above is incapable of providing such an indication.

It has therefore been proposed, notably in Senn Patent No. 2,720,810 and in Williamson et al. Patent No. 2,886,717, to provide two photocells instead of one and to arrange that the output of the first cell control an upward count of cycles, while the output of the other cell controls a downward cycle count. Aside from the increased complexity of the indicating apparatus, itself undesirable, this approach evidently requires, for given dimensions of a photocell (and these are normally as minute as possible) that the areas of transparent portions of the grid and of the window or windows be at least doubled; and to ensure against the adverse effects of a possible overlapping of or interference between the light beams impinging on the two photocells, trebled or quadrupled. Every such increase in size adds to the weight of the apparatus and so reduces its sensitivity and its suitability for its intended use, especially with samples of small dimensions and samples which may undergo high accelerations or both.

The present invention provides a ready indication, in the form of a visual waveform record of the response of the light sensor which reveals the sense, as well as the magnitude, of the displacement; and this without increase of any aperture size and without benefit of any auxiliary electronic apparatus. It does so by departing from the teaching of the prior art that the two tandem-arranged apertures, i.e., the window or windows of the gate and the transparent portions of the grid, should be geometrically similar. In contrast, the aperture of one of the two members, preferably the window, differs from that of the other member in being longitudinally asymmetric: the half on one side of its transverse axis differs in shape from the half on the other side of the same axis. The asymmetry may take a practically unlimited number of different forms; one margin may be straight, the other curved; one may be concave, the other convex; one may be long in the transverse dimension, the other short, and so on. In an especially simple form a parallel-sided window, otherwise the same as that of the prior art is provided, between its center line and one of its transverse margins, with a narrow opaque septum which acts as a light stop. As the window passes across the grid in one sense, i.e., in the sense in which the septum is located in the lagging or trailing half of the window, it briefly obscures a small part of the light beam in its progress, first from full obscuration to nearly full exposure and then from exposure to obscuration, the corresponding rising and falling portions of the photocell output current are modified and the modification is visually revealed as small breaks in the later portions of the otherwise smooth rise and fall of the leading and lagging shoulders of the record wave. As the window passes over the grid in the opposite sense, the same septum finds itself in the leading half of the window, the partial obscuration takes place during the first half of each half cycle, and the record of the photocell output current carries the breaks on the earlier portions of its shoulders. Thus, from a glance at the record wave which always bears the asymmetric sense indication, either on the earlier portions or on the later portions of its shoulders, the observer is immediately informed of the sense of the movement. This is of especial importance when, as sometimes happens, a brief momentary reversal of direction takes place in the course of a generally continuous movement in one sense. To determine the magnitude of the movement the observer counts cycles of the photocell output current as before, and estimates fractions of any uncompleted cycles; and, in addition to informing him of the sense of the movement, asymmetries of certain kinds assist him in refining this estimate.

In principle and from the standpoint of the operation of the apparatus, it is of no consequence whether the asymmetry be embodied in the window of the light gate or in the several transparent portions of the gridded tape. Insofar as fabrication of an aperture having asymmetry of a particular kind may present difficulties or require especial care, it may be economical to endow the single light gate window with the asymmetry, leaving the several transparent portions of the gridded tape symmetric. Once the asymmetric configuration has been selected and a pattern having the required shape has been prepared, photographic techniques can be employed to duplicate it as often as need be. Even so, the difference in cost is not trivial. Since, to avoid awkwardness of language in the description to follow, a choice of illustration must be made, it is chosen for reasons of economy to regard the light gate window or windows as constituting the asymmetric aperture or apertures, and the transparent portions of the gridded tape as constituting the symmetric ones. The reader will readily see that in every case they may be interchanged.

The invention will be fully apprehended from the following detailed description of illustrative embodiments thereof taken in connection with the appended drawings in which:

FIG. 1 is a diagram, partly in perspective, illustrating the manner in which the invention is employed in the measurement of strain;

FIG. 1A is a perspective view of a light gate having an asymmetric window which may be included in the assembly of FIG. 1;

FIG. 2 is an enlarged view of a gridded tape;

FIG. 3 is an enlarged view of two asymmetric windows disposed for cooperation with the tape of FIG. 2;

Figure 4:
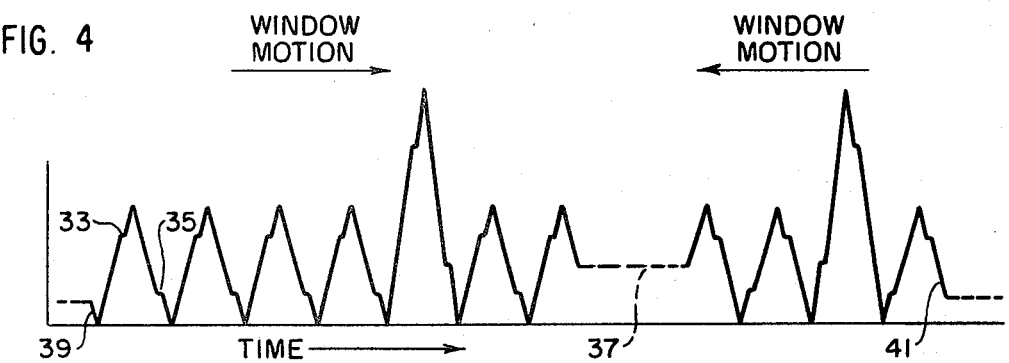
FIG. 4 is a diagram showing the wave developed by the oscilloscope of FIG. 1 when one of the windows of FIG. 3 is passed over the gridded tape of FIG. 2.

Referring now to the drawings, FIG. 1 shows a specimen 1 of a yielding material, for example, sheet rubber, of which one end is clamped between the jaws of a vise 3 while the other end is subjected to tension by an external force 5. At a point 7 of the specimen 1 suitably spaced from the clamping vise 3, one end of a gridded tape 9 is fixed as by adhesive. Between this point 7 and the vise 3 there is fixed, at a point 11, an assembly 13 containing a photoelectric converter 14, the asymmetric light gate of the invention and a guide 15 for the gridded tape 9. In order to hold the inertial interaction of the instrument with the specimen 1 to a low level the assembly 13 is as small as it can conveniently be made and is shown in the figure greatly enlarged. As a practical matter, the tape 9 itself may be of the order of one-eighth inch wide, the tape guide 15 being of the same width and constructed of light plastic material. The asymmetric light gate window, for example, the window 17 in the gate 19 shown in FIG. 1A, is concealed within the assembly 13 immediately below the gridded tape 9. The photoelectric converter 14 which is advantageously a cell of the photovoltaic type, is disposed below the gate 19. It may be a few thousandths of an inch in thickness and of an area of the order of 10 square millimeters or less. The weight of the entire assembly can be held to the order of one gram.

A lamp 21 is mounted at a suitable point above the assembly 13 and the light from this lamp is directed, as by a lens 23 onto the gridded tape 9 at a point immediately above the asymmetric window 17. As the separation $L_g$ (gage length) between the two fiducial points 7, 11 of the specimen 1, is altered, transparent portions of the gridded tape 9 pass in succession over the window 17 admitting light of the lamp 21 to the photoelectric cell 14 which then delivers current to an indicating device. Because of its rapid speed of response an oscilloscope 25 of the cathode beam type is preferred as an indicator. When the cathode beam is swept laterally in the usual way by a saw tooth wave to provide a time base, a pattern constituted of a trace 27 or traces appears on the oscilloscope screen. It may be observed visually and may also be recorded by a camera 29.

To facilitate the counting of the cycles in the visual record, the transparent portions of the tape 9 each of which has parallel sides extending transversely of the tape, may be of different transverse lengths; for example, every fifth one may be longer than the others. Such a tape is shown in FIG. 2 to a greatly enlarged scale. As a matter of practice, a tape ⅛ inch in width and bearing transparent portions of which the (longitudinal) width dimensions are about .025 inch, while the intermediate opaque portions are of the same width, is entirely feasible. Moreover, commercial photographic film, while sufficiently flexible to permit ready winding on a roll is at the same time sufficiently light in weight for the purpose and, if not of undue length, sufficiently stiff to permit it to be pushed through the tape guide 15 in one direction, as well as pulled through it in the opposite direction. Accordingly, it is preferred to make the tape 9 of photographic film and by conventional photographic techniques. Such film is available commercially. Its weight is of the order of a few milligrams per inch of its length.

FIG. 3 shows a double light gate 19a having two transparent windows 17a, 17b bounded by opaque frames and each containing an asymmetry, in the direction of the tape movement, of the same sort as that of the window 17 of FIG. 1A. That is to say, each window is of the same width, in the direction of relative movement, as one of the transparent portions of the gridded tape 9 and, advantageously, of a height, i.e., the dimension transversely of the tape 9, equal to the height of the longest of the transparent portions of the tape 9. The light gate 19a may be a short length of photographic film, each of its windows being transparent and bounded by an opaque frame.

In accordance with the invention in one of its simplest forms the window 17 of FIG. 1A and each of the windows of FIG. 3 contains a thin, hair-like septum or stop 31 disposed parallel to one of the window margins and located to one side of the center line of the window, for example, at a distance from one window margin equal to one-quarter of the full window width.

Considering now the effect of relative movement between the gridded tape 9 of FIG. 2 and any of the windows of FIG. 1A or FIG. 3 and, for ease of description, considering the tape of FIG. 2 to be fixed and the window 17 of FIG. 1A to be moved across it (the opposite of the arrangement of FIG. 1) suppose, for ease of comprehension, that before the commencement of the movement the window 17 registers exactly with an opaque portion of the tape 19. The light from the lamp 21 is thus obscured from the photocell 14 and the output current of the latter is zero. This condition is represented by the zero line to which each of the downwardly-extending peaks of the wave of FIG. 4 reaches.

Suppose, now, that the window 17 commences to move to the right across the gridded tape 9. Immediately, a part of one of the transparent portions of the tape 9 is exposed, the photocell 14 receives a small amount of light, and a small amount of output current flows to the oscilloscope 25 to cause a rise of its indicating spot. When the movement has progressed through about three-quarters of the width of the window 17, the opaque septum 31 commences to encroach on the right-hand margin of the transparent portion of the tape 9 and further increase of the light flux and of the photocell current and further rise of the indicating spot on the oscilloscope screen cease. This condition holds until the left-hand edge of the septum 31 shall in turn have encroached upon the right-hand margin of the transparent tape region. As shown in FIG. 4, this pause in the rise of the photocurrent is reproduced as a horizontal pedestal 33 in the upper half of the rising shoulder of the wave and of a width, in the direction of movement, depending on the dimensions of the opaque septum 31 in the window 17 and the time base adjustment of the oscilloscope 25. Thereupon the increase of light flux and the rise of the indicating spot on the oscilloscope screen are resumed and the rise continues until the outer margins of the window 17 are in exact register with the outer margins of the transparent portion of the gridded tape 9. At this point the window 17 has moved through its own full width; and the recorded wave has passed through one half cycle.

As the movement progresses further and the window 17 moves along its course and onto one of the intervening opaque portions of the tape, the light flux begins to be reduced and the vertical excursion of the indicating spot on the oscilloscope screen commences to be diminished. When the movement has progressed through a further distance of three quarters of the window width, the septum 31 encroaches on the right-hand dark margin of the window, no further reduction of the light flux, and no further diminution of the vertical excursion of the light spot, can take place until the septum 31 lies wholly over the opaque portion of the gridded tape 9, whereupon the light reduction and the sloping fall of the trace are resumed. The result, evidently, is a plateau or pedestal 35 in the second half of the falling portion of the recorded wave. Thereafter, as the movement proceeds, the recorded wave continues to fall until it again reaches the zero line, and this occurs when the window 17 is again in register with one of the opaque portions of the tape 9; i.e., after one full cycle of the movement. Passage of the window 17 over another transparent portion of the tape 9 makes for a repetition of the wave cycle. If the transparent portion be one of the longer ones, the height of the wave peak is correspondingly increased as in the case of the fifth cycle of the wave of FIG. 4, the locations of the pedestals 33, 35 remaining unaltered.

If the movement should come to a stop with an arbitrary disposition of the window 17 relatively to the gridded tape 9, the light flux reaching the photocell 14 remains constant and vertical excursion of the indicating spot on the oscilloscope screen remains fixed. The cessation of movement is reflected as a horizontal line 37 on the oscilloscope trace and on the camera film which records it. The pause may be a long one, as indicated by the break in FIG. 4. The height of the pause line above the zero line is of assistance in estimating the fraction of the final wave cycle through which the wave passed before cessation of the movement.

To facilitate the exposition, it was assumed above that, before the commencement of the movement, the window 17 was in exact register with one of the transparent portions of the gridded tape 9. This, of course, is unrealistic. To the contrary, when the tape and the assembly are first fixed to the specimen to be tested, the relative positions of the window and the transparent tape portions are wholly arbitrary. As long as the spacing between the two points 7, 11 of the specimen at which the tape 9 and the assembly 13, respectively, are fixed is known, failure of initial registration is of no consequence. Its only effect is that, in his final determination, the inspector must estimate the magnitude of the first fractional cycle 39 of the recorded wave, as well as the last one.

Under some circumstances, notably in the measurement of unidirectional strain, the experiment may now be finished, and it only remains for the observer to determine the magnitude and sense of the strain undergone by the specimen. The sense is immediately apparent from a knowledge of the location of the septum 31 in the light gate window 17 and an examination of the location of the pedestals 33, 35 on the recorded wave. The magnitude is determined by a count of the cycles of the recorded wave, for which purpose it is of advantage that every fifth one or every tenth one, for example, should be of greater amplitude than the others, as in the case of an ordinary measuring ruler. Thus, the observer counts the completed cycles and estimates the magnitudes of the initial and terminal fractional cycles 39 and 41; and this estimate is facilitated by the presence of the pedestals 33, 35 in the wave.

After the pause, reproduced in FIG. 4 as the horizontal line 37, movement may perhaps be resumed in the same sense, in which case the several cycles of the resulting wave are as described above and as shown in the left-hand portion of FIG. 4. By contrast, after the pause, the movement may be reversed, i.e., the window 17 may move in a left-hand direction relatively to the tape 9, as might happen if the external force 5 were to be relaxed. When this occurs, each half-cycle of the resulting wave is, as shown in the later portion of FIG. 4, a mirror image of one of the earlier cycles described above; that is to say, their left-hand sides are interchanged with their right-hand sides as compared with the corresponding sides of the earlier portion of the wave. Thus the second portion of the wave of FIG. 4 contains, first, a partial cycle in the reverse direction, a full cycle in the reverse direction representing passage over one of the narrower transparent portions of the tape, a full cycle of greater amplitude representing passage of the window 17 across one of the wider transparent tape portions, another full cycle representing passage of the window across the next narrower portion, about three quarters of another cycle and, finally, a pause. Thus, it is plain from examination of the left-hand portion of FIG. 4 that the initial movement was such as to produce seven vertical peaks in the recorded wave; six full cycles, preceded and followed by fractions of a cycle. The observer was thus immediately informed that the movement occupied six full cycles and fractions of the first and of the last. But after the pause 37, the record of the right-hand portion of FIG. 4 shows that the specimen 1 did not return to its original length; and this because, in the second portion of the wave of FIG. 4, the mirror images of the first three cycles of the earlier portion are missing. From this, the amount of hysteresis or permanent strain which characterizes the material of the sample can readily be estimated.

In many cases, a single window such as that shown in perspective in FIG 1A or either of those shown diagrammatically in FIG. 3 serves all purposes. In special cases, however, it may be desirable to reduce the inertial interaction between the apparatus and the sample to an absolute minimum, even to the extent of disengaging the tape guide 15 and the photoelectric converter 14 from the sample 1, leaving only the gridded tape 9 attached at one point of the sample and the gate 19 at another point of the same sample. For movements of sufficiently minute magnitudes, a single window suffices, even in this case. But when, as often occurs, the movement is several times the window dimensions in extent, the asymmetric window of the invention may be duplicated as often as need be. If duplicated sufficiently often, the result is a second gridded tape, of which the outside dimensions of the several windows are such as to register with the outside dimensions of the transparent portions of the first tape, albeit every window of the second tape contains an asymmetric feature and all of the asymmetric features are identical from window to window. FIG. 3 shows a portion of such an extended asymmetric gridded tape.

Figure 5:
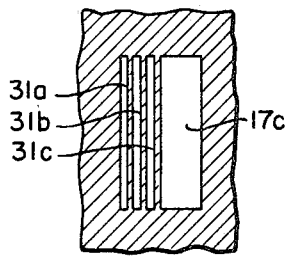
FIG. 5 shows an asymmetric window of a different form.
Figure 6:
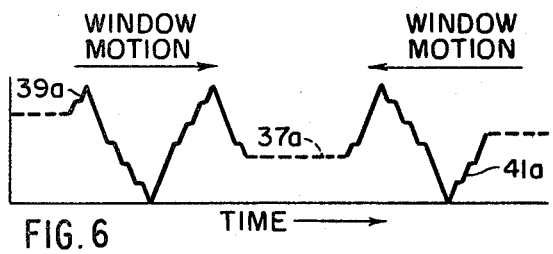
FIG. 6 shows a portion of the wave resulting from passage of the window of FIG. 5 over the gridded tape of FIG. 2.

The operation of the invention has been described in the context of an asymmetry of a particular sort, that is to say, a thin opaque septum 31 displaced from the center of the light gate window 17. Many other asymmetries are possible. One extension of the asymmetry described above is to provide a plurality of such opaque septa. FIG. 5 shows such a window 17c containing three such opaque septa 31a, 31b, 31c all lying in the left-hand half of the window. From the foregoing description it will be evident to the reader that the waveform which results from the passage of such a window across a parallel-sided transparent portion of the gridded tape is as shown in FIG. 6. Here, for movement in one direction the upper half of the left-hand slope of each full wave cycle carries three pedestals while the lower half of the right-hand slope likewise carries three pedestals. After a reversal of the direction of movement as shown by the pause the wave is, as before, a mirror image of the first portion.

If precision of measurement of a fraction of a half-cycle should be of the highest importance, narrow septa can be disposed on both sides of the center line of the window, each giving rise to a pedestal in the resulting recorded wave, provided only that some feature of their arrangement is asymmetric in the longitudinal dimension of the window. For example, three such opaque lines could be provided in the left-hand half of the window and two in the right-hand half. By simply counting pedestals and determining which of the two halves of the leading slope of the recorded wave bears three pedestals and which of its halves bears two pedestals, it can immediately be determined whether the movement giving rise to the wave was a movement of the window to the left or a movement to the right.

Figure 7:
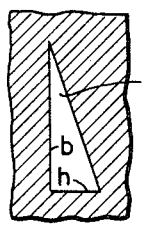
FIGS. 7 and 8 show two alternative triangular windows.
Figure 8:
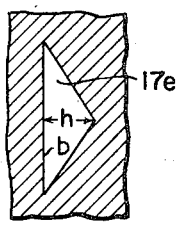
Figure 9:
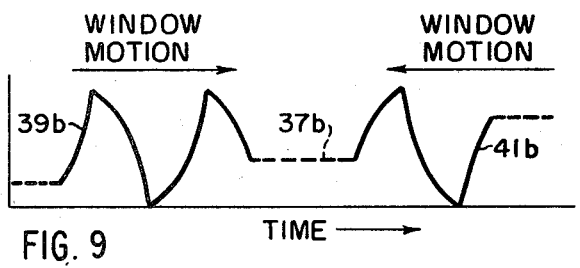
FIG. 9 shows a portion of the wave resulting from passage of either of the windows of FIGS. 7 and 8 across the gridded tape of FIG. 2.

Asymmetric windows of two further shapes are shown in FIGS. 7 and 8. In each case, the shape of the window is triangular. In FIG. 7, the aperture of the window has the shape of a right triangle of which the base $b$ is equal in length to the transverse dimension of one of the larger transparent portions of the gridded tape. In FIG. 8, the triangle is isosceles and its base $b$ has the same dimension. In each case the altitude $h$ is equal to the width of the tape aperture. The waveforms of the recorded wave which results from a passage of either of these windows across a parallel-sided transparent portion of the gridded tape is the same in each case and is shown in FIG. 9. It consists of a sequence of waves of which one side is concave upward, and the other side concave downward, each curve being a portion of a parabola. For movement in one direction, as shown in the earlier portion of FIG. 9, the rising side of each cycle of the wave is concave upward and its falling side is concave downward. For movement in the reverse direction as shown in the later part of FIG. 9 and after the pause 37b, the curvatures of the two sides of the wave cycles are interchanged. A further advantage of the triangular windows of FIGS. 7 and 8 is that the curvatures of the resulting wave cycles could be sensed electronically, thus allowing the movement to proceed and the data to be obtained automatically.

Whatever the character of the asymmetry of the light gate window, it is desirable that its greatest longitudinal dimension be equal to the length of each parallel-sided transparent portion of the gridded tape. Hence, the total area of the window is in every case somewhat less than the total area of one of the transparent portions of the gridded tape. It follows that the price, at which the many advantages afforded by the asymmetric window are purchased, is merely a slight reduction in the total light flux through the window. As a practical matter, this reduction is insignificant.

Asymmetries of other kinds than those described above and fields of use other than the measurement of strains will suggest themselves to those versed in the art.

The invention having now been described, what is claimed is:

1. Apparatus for determining and indicating the magnitude and sense of the relative movement between two object points which comprises
   an elongated member fixed to the first point and extending at least to the second point,
   said member bearing a plurality of equally spaced, symmetric transparent regions of like preassigned widths extending transversely thereof and being elsewhere opaque,
   a light gate having an asymmetric window of a width dimension equal to the width dimensions of said transparent regions, said light gate being fixed to said second point in an orientation to register with one of said regions,
   a source disposed to project a beam of light through said member and said gate in tandem,
   a photoelectric converter disposed to receive said projected light,
   and means for making a visual record of the current delivered by said converter,
   said record comprising a plurality of cycles, each representing a relative movement between said member and said gate through the center-to-center spacing between said regions,
   the leading side of each cycle differing in character from its trailing side in dependence on the asymmetry of said window,
   whereby the magnitude of said movement can be determined by a count of the cycles of said record and the sense of said movement can be determined by examination of the waveform of said record.

2. Apparatus for determining and indicating the magnitude and sense of relative movement between two object points which comprises
   a first elongated grid having a plurality of equally spaced symmetric transparent portions of like preassigned widths, extending transversely thereof, and intervening opaque portions, said first grid being fixed to the first point and extending toward the second point,
   a second elongated grid having a plurality of equally spaced transparent portions of widths like those of the first grid, extending transversely thereof, and intervening opaque portions, said second grid being fixed to the second point, and extending toward the second point in overlapping disposition to at least a part of the first grid,
   the transparent portions of the second grid being longitudinally asymmetric,
   a source disposed to project a beam of light through both grids,
   a photoelectric converter disposed to receive said projected beam,
   and means for making a visual record of the current delivered by said converter,
   said record comprising a plurality of cycles, each representative of a relative movement through the center-to-center spacing between adjacent transparent portions of either grid, the leading side of each cycle differing in shape from its trailing side in dependence on the asymmetry of the transparent portions of the second grid,
   whereby the magnitude of said movement can be determined by a count of said cycles and the sense of said movement can be determined by a comparison of the shapes of the leading sides of said cycles with their trailing sides.

3. In combination with a gridded tape having a plurality of transparent portions of like shapes and of like maximum widths extending transversely thereof, separated by intervening opaque portions, said transparent portions constituting apertures of a first kind, a light gate which comprises an opaque frame bounding and defining a transparent window of the same said maximum width, said window constituting an aperture of a second kind, one of said first and second aperture kinds being characterized by asymmetry of its configuration about its transverse axis, whereby, when a beam of light is projected, through the tape and the light gate in tandem, onto a light sensitive element and relative movement takes place between the tape and the gate in a direction parallel to the length of the tape, the flux of light impinging on the element varies in dependence on the sense of said movement.

4. In combination with a gridded tape having a plurality of equally spaced, rectangular transparent portions of like widths extending transversely thereof separated by intervening opaque portions, a light gate which comprises an opaque frame bounding and defining an asymmetric window of which the width, at its widest part, is coordinated with the width of one of the transparent portions of the tape in a fashion to produce registration therebetween whereby, when a beam of light is projected through the tape and the window in tandem and onto a light sensor and relative movement takes place between the tape and the gate in a direction parallel to the length of the tape, the flux of light impinging on the sensor varies in dependence on the sense of said movement.

5. A light gate as defined in claim 4 wherein the outline of the window is a rectangle, congruent with one of the rectangular transparent portions of the tape, said window being provided with at least one narrow opaque septum disposed between one margin of said window and the center line of said window.

6. A light gate as defined in claim 5 wherein said septum extends from side to side of said window in a direction transverse to the direction of said relative movement.

7. A light gate as defined in claim 4 wherein the outline of the window is a rectangle, congruent with one of the rectangular transparent portions of the tape, said window being provided with a plurality of narrow opaque septa extending from side to side of said window in a direction transverse to the direction of said relative movement, the number of said septa on one side of the center line of said window differing from the number of said septa on the opposite side of said center line.

8. A light gate as defined in claim 4 wherein the outline of the window is a triangle, the base of said triangle extending transversely to the direction of said relative movement, the altitude of said triangle being equal in length to the width of one of the transparent portions of said tape.

9. A light gate as defined in claim 8 wherein the outline of the window is a right triangle.

10. A light gate as defined in claim 8 wherein the outline of the window is an isosceles triangle.

References Cited

UNITED STATES PATENTS

| | | | |
|---|---|---|---|
| 2,311,142 | 2/1943 | Turrettini | 192—143 |
| 2,406,299 | 8/1946 | Koulicovitch | 250—237 |
| 2,886,717 | 5/1959 | Williamson et al. | 250—220 |
| 3,153,111 | 10/1964 | Barber et al. | 250—237 X |

DAVID J. GALVIN, *Primary Examiner.*

JAMES W. LAWRENCE, *Examiner.*

V. LAFRANCHI, *Assistant Examiner.*